US012657481B1

(12) United States Patent
Xie et al.

(10) Patent No.: US 12,657,481 B1
(45) Date of Patent: Jun. 16, 2026

(54) APPARATUS AND METHOD FOR ORCHESTRATING AN ARTIFICIAL INTELLIGENCE AGENT

(71) Applicant: ZipHQ, Inc., San Francisco, CA (US)

(72) Inventors: Jerry Xie, San Francisco, CA (US);
Joseph Tobin, San Francisco, CA (US);
Yunshan Trevor Weng, San Francisco,
CA (US); William Yan, San Francisco,
CA (US); Junfeng Zhuang, San
Francisco, CA (US); Jingzhi Jian, San
Francisco, CA (US); Amanda Yam,
San Francisco, CA (US); **Jack
D'aquila**, San Francisco, CA (US)

(73) Assignee: ZipHQ, Inc., San Francisco, CA (US)

( * ) Notice: Subject to any disclaimer, the term of this patent is extended or adjusted under 35 U.S.C. 154(b) by 0 days.

(21) Appl. No.: 19/300,517

(22) Filed: Aug. 14, 2025

(51) Int. Cl.
*G06N 20/00* (2019.01)
*G06N 5/022* (2023.01)

(52) U.S. Cl.
CPC .................................. *G06N 5/022* (2013.01)

(58) Field of Classification Search
None
See application file for complete search history.

(56) References Cited

U.S. PATENT DOCUMENTS

2007/0038499 A1* 2/2007 Margulies ........ G06Q 10/06316
705/7.26
2025/0209297 A1* 6/2025 Reid ...................... G06N 3/006

* cited by examiner

*Primary Examiner* — David R Vincent
(74) *Attorney, Agent, or Firm* — Goodwin Procter LLP

(57) ABSTRACT

An apparatus for orchestrating an artificial intelligence agent is disclosed, An apparatus for orchestrating an artificial intelligence agent may include a processor. An apparatus may include a memory communicatively coupled to a processor, the memory containing instructions configuring the processor to perform various functions. A processor may be configured to generate a processing template comprising a dataflow. A processor may be configured to modify a processing template to include a trigger for execution of an artificial intelligence agent at a point within a dataflow. A processor may be configured to insert at least one agent executable at a trigger of a processing template. A processor may be configured to execute a dataflow of a processing template, wherein at a trigger within the dataflow an artificial intelligence agent performs an agent executable.

20 Claims, 9 Drawing Sheets

200

Figure 3:
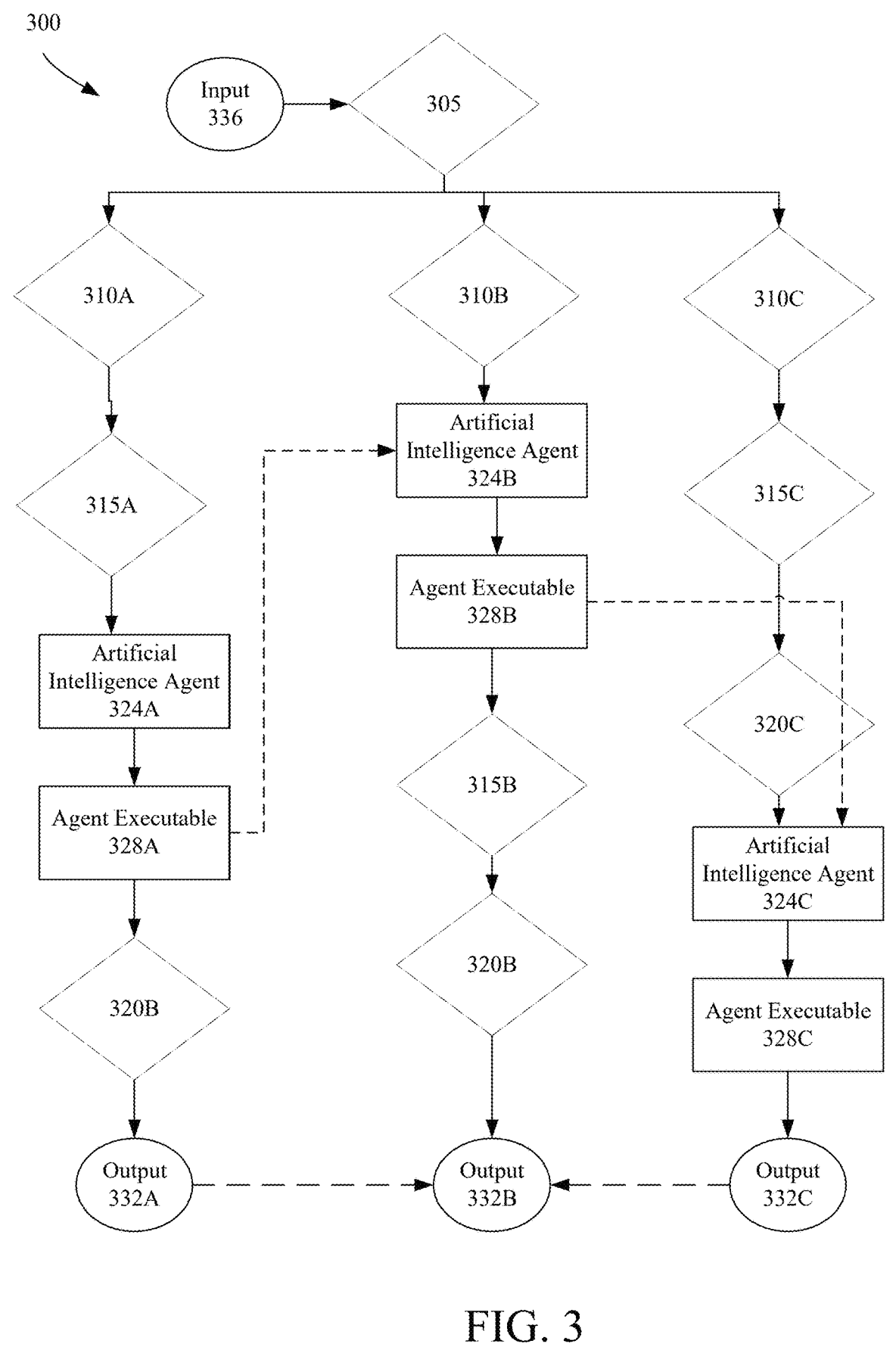

300

Input
336

305

310A

310B

310C

315A

Artificial
Intelligence Agent
324B

315C

Artificial
Intelligence Agent
324A

Agent Executable
328B

Agent Executable
328A

315B

320C

Artificial
Intelligence Agent
324C

320B

320B

Agent Executable
328C

Output
332A

Output
332B

Output
332C

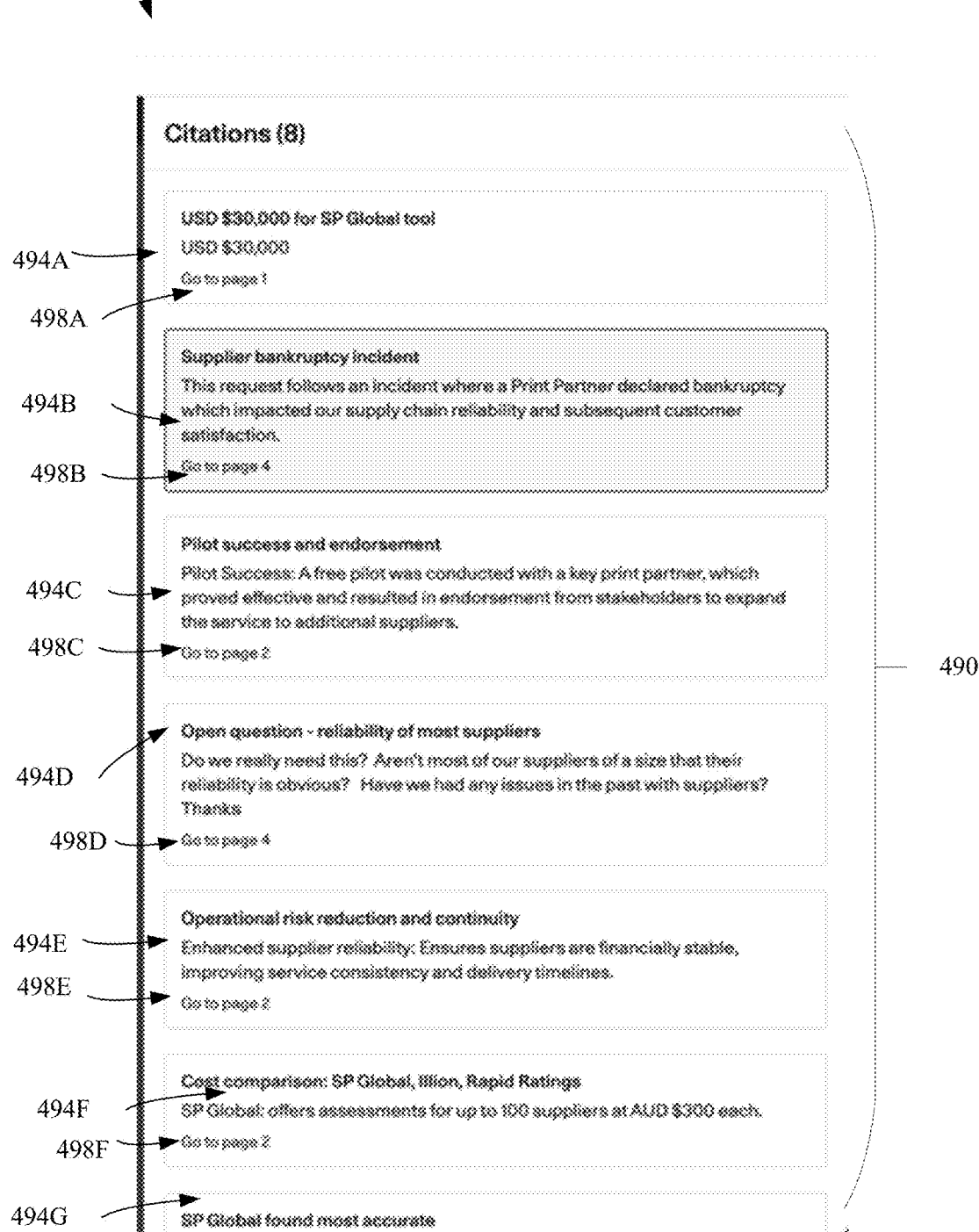

Citations (8)

494A — USD $30,000 for SP Global tool
USD $30,000
498A — Go to page 1

494B — Supplier bankruptcy incident
This request follows an incident where a Print Partner declared bankruptcy which impacted our supply chain reliability and subsequent customer satisfaction.
498B — Go to page 4

494C — Pilot success and endorsement
Pilot Success: A free pilot was conducted with a key print partner, which proved effective and resulted in endorsement from stakeholders to expand the service to additional suppliers.
498C — Go to page 2

494D — Open question - reliability of most suppliers
Do we really need this? Aren't most of our suppliers of a size that their reliability is obvious? Have we had any issues in the past with suppliers? Thanks
498D — Go to page 4

494E — Operational risk reduction and continuity
Enhanced supplier reliability: Ensures suppliers are financially stable, improving service consistency and delivery timelines.
498E — Go to page 2

494F — Cost comparison: SP Global, Illon, Rapid Ratings
SP Global: offers assessments for up to 100 suppliers at AUD $300 each.
498F — Go to page 2

494G — SP Global found most accurate

APPARATUS AND METHOD FOR ORCHESTRATING AN ARTIFICIAL INTELLIGENCE AGENT

TECHNICAL FIELD

The following disclosure is directed to apparatuses and methods for artificial intelligence agents. In particular, the present disclosure is directed to apparatuses and methods for orchestrating an artificial intelligence agent.

SUMMARY OF THE INVENTION

An apparatus for orchestrating an artificial intelligence agent is disclosed, An apparatus for orchestrating an artificial intelligence agent may include a processor. An apparatus may include a memory communicatively coupled to a processor, the memory containing instructions configuring the processor to perform various functions. A processor may be configured to generate a processing template comprising a dataflow. A processor may be configured to modify a processing template to include a trigger for execution of an artificial intelligence agent at a point within a dataflow. A processor may be configured to insert at least one agent executable at a trigger of a processing template. A processor may be configured to execute a dataflow of a processing template, wherein at a trigger within the dataflow an artificial intelligence agent performs an agent executable.

A method of orchestrating an artificial intelligence agent is disclosed. A computer-implement method for orchestration of an artificial intelligence agent may include generating a processing template comprising a dataflow. A method may include modifying a processing template to include a trigger for execution of an artificial intelligence agent at a point within a dataflow. A method may include inserting at least one agent executable at a trigger of a processing template. A method may include executing a dataflow of a processing template, wherein at the trigger within a dataflow an artificial intelligence agent performs an agent executable.

BRIEF DESCRIPTION OF THE DRAWINGS

FIG. 3 illustrates a processing template of an orchestration of a plurality of artificial intelligence agents;

FIGS. 4A-C illustrate embodiments of graphical user interfaces;

DETAILED DESCRIPTION

At a high level, apparatuses, systems, and methods for orchestrating artificial intelligence (AI) agents are disclosed. Conventional computer processes and methods may require many calculations, data retrieval, graphical user interface (GUI) navigations, or other tasks. Using conventional computer processes and methods may result in longer processing times, complex decisions from a user regarding user input, and may be resource inefficient. Embodiments described herein may allow for integration of one or more AI agents within a computer process, overcoming the above identified technical problems. Integration of one or more AI agents within a computer process may reduce processing time and/or complexity of the computer process. For instance, an AI agent may be insertable into a dataflow of a computer process. A trigger may be set at a point within a dataflow that may activate an AI agent. An AI agent may perform one or more executables once a dataflow reaches a trigger point. AI agents may be specifically trained on training data relating to one or more computer processes. A type of AI agent may be selectable, which may enable precise computer processing for a specific task within a dataflow compared to generalized machine learning models. AI agents may be insertable into any point within a dataflow. In some embodiments, two or more AI agents may be inserted into a single or parallel data flow. Outputs of a first AI agent may be used as inputs into a second AI agent, which may allow for scalability of a computer process. In some embodiments, a GUI is disclosed which may allow a user to customize selection of AI agent, triggers within a dataflow, dataflow steps, integration of AI agents with one or more other dataflows, or other variables described herein.

Figure 1:
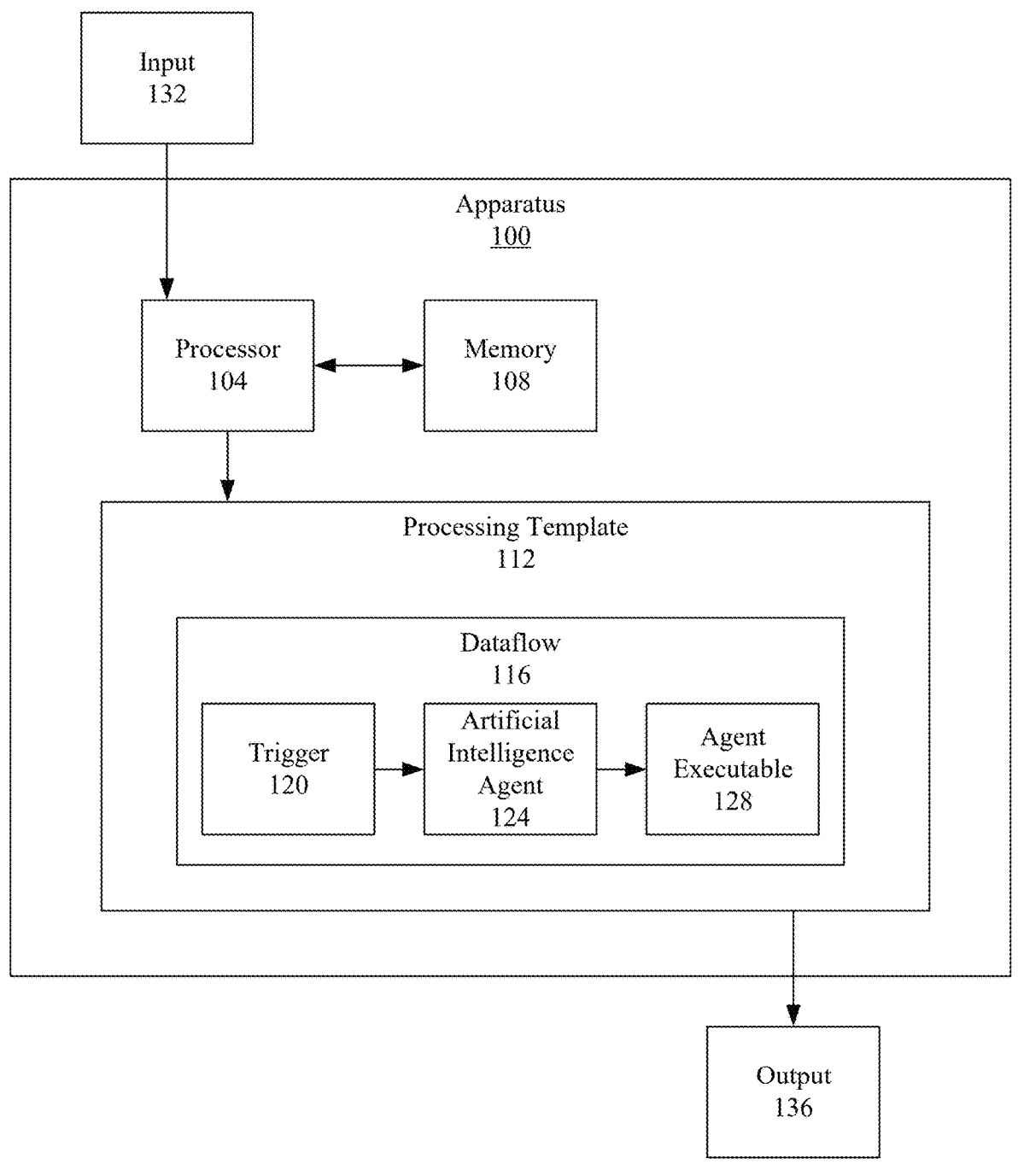
FIG. 1 is a block diagram of an apparatus for orchestrating an artificial intelligence agent.

Referring to FIG. 1, a block diagram of apparatus 100 is presented. Apparatus 100 may include processor 104. Processor 104 may be any type of processor, such as, but not limited to, microprocessors, System on Chips (SoCs), programmable data arrays, central processing unit (CPU), or other form of processor. Processor 104 may be communicatively coupled to memory 108. "Communicatively coupled" as used in this disclosure refers to a connection between two or more objects in which information may be shared. For instance, processor 104 and memory 108 may be electrically coupled to each other. Memory 108 may be any type of memory, such as, but not limited to, random access memory (RAM), dynamic RAM, static RAM, solid state drive (SSD), magnetic storage, or other types of memory. Memory 108 may be configured to store instructions that may allow processor 104 to perform various functions.

Processor 104 may be configured to generate or obtain processing template 112. A "processing template" as used in this disclosure refers to a data structure outlining one or more computer processing steps. A "computer processing step" as used in this disclosure refers to an instance in which a computing device performs a function. "Computer processing step" may be used interchangeably with "processing step" or "computer step" throughout this disclosure. Functions may include, but are not limited to, generating queries, data field entries, retrieval of data, addition of data, subtraction of data, multiplication of data, division of data, communication of data, conversion of data, or any other function a computing device may perform. A computer processing step may perform a CPU based function, such as numerical calculations. In some embodiments, a computer processing step may perform a graphics processing unit (GPU) based function, such as training and/or execution of one or more machine learning models. In some embodiments, a computer processing step may perform a combination of CPU based and GPU based functions. As a non-limiting example, a CPU and GPU based function may include generation of a search query and execution of the search query using a machine learning model. In some embodiments, a computer processing step may include two or more functions. Two or more functions of a computer processing step may be of a same function type or may be of differing function types. In some embodiments, a computer processing step may utilize user input which may be provided through a GUI in communication with processor 104. A combination of user input computer processing steps and automatic computer processing steps may be implemented within processing template 112.

Processing template 112 may include two or more computer processing steps. In some embodiments, processing template 112 may include various sequences of two or more computer processing steps. For instance, processing template 112 may include a linear sequence of computer processing steps. A linear sequence of computer processing steps may be an arrangement of computer processing steps in which output of a first computer processing step is used directly as input at a second computer processing step and so on. Processing template 112 may include a recursive sequence of computer processing steps. A recursive sequence of computer processing steps may be an arrangement of two or more computer processing steps in which output of a second or later computer processing steps is used as input to a computer processing step appearing prior to the second or later computer processing steps. In some embodiments, a recursive sequence of computer processing steps may continuously occur until an exit criteria is met. An exit criteria may include, but is not limited to, data value thresholds, matching of queries to targeted data, or other criteria. Processing template 112 may include a branch sequence of computer processing steps. A branch sequence of computer processing steps may be a sequence of computer processing steps in which at least one computer processing step provides output to two or more subsequent computer processing steps. Processing template 112 may have a non-sequential sequence of computer processing steps. A non-sequential sequence of computer processing steps may be a sequence of computer processing steps in which two or more non-sequential processing steps perform a function. For instance, a computer processing step of a first sequence of computer processing steps may occur at a same time as a computer processing step of a second sequence of computer processing steps. Any arrangement of computer processing steps, including combinations of, but not limited to, sequential, non-sequential, recursive, branch, or other computer processing steps may be used, without limitation. In some embodiments, an arrangement of computer processing steps of processing template 112 may be specific to a desired output 136 and/or input 132. For instance and without limitation, a desired output 136 may be a projected impact of weather on delay in a delivery of goods, which may utilize a branching sequence of computer processing steps.

Processing template 112 may have a start point. A "start point" as used in this disclosure refers to an initial step in a computer process. A start point of processing template 112 may be a trigger causing a computing device executing processing template 112 to perform one or more computer processes of processing template 112. For instance, a start point may trigger based on trigger criteria. Trigger criteria may include, but is not limited to, user input, receival of data, time of day, completion of one or more prior computer processes, or other criteria. Processing template 112 may have an end point. An "end point" as used in this disclosure refers to a termination of a computer process. An end point of processing template 112 may be a point in which a computing system executing processing template 112 terminates one or more computer processes. An end point may be triggerable based on trigger criteria such as, but not limited to, completion of one or more computer processes, generation of one or more data structures, or other criteria. In some embodiments, processing template 112 may have a temporal arrangement of computer processing steps. A "temporal arrangement" as used in this disclosure refers to an arrangement of two or more computer processing steps according to a sequence. For instance, a first computer processing step of processing template 112 may appear in a sequence of computer processing steps before a second computer processing step of processing template 112. A second computer processing step of processing template 112 may utilize data output of a first prior computer processing step of processing template 112. In some embodiments, two or more computer processing steps may have a same temporal arrangement within processing template 112. For instance, two or more computer processing steps may appear at a same time relative to prior and/or subsequent computer processing steps. In some embodiments, two or more computer processing steps appearing at a same time within a temporal arrangement of processing template 112 may correspond to the two or more computer processing steps being executed by a computing device at a same time.

In some embodiments, a temporal arrangement may include a wait time. A wait time may be a period of time for a computer processing step to remain idle before performing a task. A wait time may be user selected, such as through a GUI in communication with processor 104. In some embodiments, a wait time may be automatically selected by processor 104 based on one or more criteria, such as, but not limited to, computer processing step type, prior computer processing step, subsequent computer processing step, or other criteria. In some embodiments, a wait time may be based on a time for completion of one or more subsequent computer processing steps. For instance, a first computer processing step may take an amount of time to complete before providing output to a second computer processing step subsequent the first computer processing step. In other embodiments, a computer processing step may remain idle until data is received. For instance, once a computer processing step receives data, the computer processing step may perform a function but otherwise may remain unchanged. In some embodiments, two or more non-sequential computer processing steps may perform a function before corresponding sequential processing steps. For instance, a first computer processing step in a sequence may perform a function at a same or overlapping time as a second computer processing step of a different or parallel sequence of computer processing steps. Outputs of computer processing steps may be provided to non-sequential computer processing steps of two or more sequences of computer processing steps.

Processing template 112 may include dataflow 116. A "dataflow" as used in this disclosure refers to an execution of one or more computer processing steps. In some embodiments, dataflow 116 may include control logic. "Control logic" as used in this disclosure refers to an order of operations set forth by one or more parameters. Control logic may be sequential, selection, and/or iteration based. Control logic may be Boolean logic. For instance, control logic may include if statements, else statements, or statements, and statements, nor statements, and statements, nor statements, or other forms of logic. Any form of control logic may be implemented at and/or between computer processing steps. For instance, a first computer processing step of dataflow 116 may include an "and statement" and a second computer processing step of dataflow 116 may include an "else if statement". A user may select which computer processing steps of dataflow 116 are run by which parameters of control logic. For instance, through a GUI in communication with processor 104 a user may select which control logic certain computer processing steps should follow. In some embodiments, computer processing steps may be assigned control logic automatically by processor 104 based on, but not limited to, type of computer processing step, type of prior and/or subsequent computer processing step, similar processing templates 112 stored in a storage device, or other factors.

Still referring to FIG. 1, dataflow 116 may include trigger 120. A "trigger" as used in this disclosure refers to a criteria that if met causes a computing device to perform a function. Trigger 120 may be set by a user via a GUI of a display device in communication with processor 104. A display device may include, but is not limited to, a smartphone, laptop, monitor, tablet, smartwatch, or any other form of display device. In some embodiments, processor 104 may automatically set trigger 120 based on previous executions of processing templates 112, similarity between processing template 112 and one or more other processing templates 112 stored in a storage device in communication with processor 104, or other factors. Trigger 120 may be inserted into dataflow 116 at a point in time within a temporal arrangement of dataflow 116. For instance, trigger 120 may be inserted into a first computer processing step, a second computer processing step, a third computer processing step, and so on. Insertion of trigger 120 may include placing software executable to run trigger 120 in a point of time of dataflow 116. In some embodiments, two or more triggers 120 may be inserted into a same dataflow 116. For instance and without limitation, a first computer processing step may have a first trigger, and a second computer processing step may have a second trigger. In some embodiments, trigger 120 may have a trigger type. A "trigger type" as used in this disclosure refers to a classification of a trigger. For instance, trigger types of trigger 120 may include, but are not limited to, AI triggers, a webhook trigger, connector trigger, approval node, or other type of trigger. An AI trigger may be a trigger 120 in which one or more AI agents 128 are executed. A webhook trigger may be a trigger 120 in which a webhook is executed. A "webhook" as used in this disclosure refers to a program configured to obtain information from the Internet. For instance, a webhook may use one or more hypertext transfer protocols (HTTP) callbacks to deliver data of an event, rather than relying on frequent data polling. In some embodiments, a trigger type may include a chatbot agent. For instance, trigger 120 may cause a chatbot agent to execute. A "chatbot agent" as used in this disclosure is a program configured to engage in conversation with a user. A trigger type may include a database search. For instance, trigger 120 may execute a search query in one or more databases based on a set of search criteria. In some embodiments, a search query may be global and may search through the Internet for any words, phrases, and/or characters meeting a search criteria. In some embodiments, a trigger type may include a risk check. For instance, trigger 120 may cause execution of a risk check of one or more entities. A risk check may include searching through one or more databases and/or the Internet for any information adverse to an entity. Information adverse to an entity may include, but is not limited to, financial information of the entity, engagement of the entity with one or more other entities, or other information. A trigger type may be an invoice. For instance, trigger 120 may execute programming to generate one or more invoices for one or more entities.

A "connector" as used in this disclosure refers to programming allowing communication between two or more softwares. In some embodiments, a connector may be an application programming interface (API). A connector may communicate data with one or more third-party applications.

Third-party applications may include, but are not limited to, digital signature applications, contract management applications, risk management applications, performance management applications, or any other type of application. A digital signature application may be an application that manages, creates, and/or communicates one or more digital signatures. A contract management application may be an application that manages data of contracts between two or more parties. A risk management application may be an application that identifies and/or predicts risks associated with an entity. A performance management application may be an application that tracks and/or predicts performance of an entity. As a non-limiting example, a connector may connect to applications such as Adobe Acrobat, Agiloft, Allocadia, Aravo, Archer, or other forms of applications. Data may be obtained from one or more applications through a connector of trigger 120. For instance, signature data, contract data, risk management data, performance management data, or any other data associated with applications described herein may be obtained by processor 104 via a connector trigger 120. Data obtained at a connector trigger 120 may be utilized in one or more computer processing steps. In some embodiments, two or more connector triggers 120 may be part of dataflow 116.

In some embodiments, a connector may include a context generator. A "context generator" as used in this disclosure refers to a machine learning model trained to identify context of one or more words and/or phrases. For instance, a context generator may input one or more documents and/or prompts and may output determined user intent. Determined user intent may be provided to AI agent 124, which may ensure AI agent 124 performs agent executable 128 aligned with a context and/or user intent. For instance, a context generator may receive a user prompt, identify context and/or user intent, obtain one or more documents relating to the identified context and/or user intent, and may provide the obtained one or more documents to AI agent 124. In some embodiments, a context generator may generate a prompt for AI agent 124 based on an identified user intent and/or context. AI agent 124 may generate output based on a prompt and/or documents received from a context generator of a connector.

An "approval node" as used in this disclosure refers to a step in a computing process in which approval is needed before resuming a function. Approval may be received by an entity. An entity may be a computing entity or a user. For instance, at trigger 120, execution of an approval node may be performed which may pause execution of dataflow 116 until consent from an entity is received. In some embodiments, only computer processes within dataflow 116 connected to an approval node may be paused while other computer processes may continue being executed. An approval node may be automatically assigned as trigger 120 by processor 104 based on data utilized in a computer processing step. In some embodiments, a webhook, approval node, or other type of computer process may be inserted into a computer processing step rather than AI agent 124. In some embodiments, a combination of two or more types of triggers 120 may be utilized in dataflow 116. In some embodiments, trigger 120 may include two or more trigger types. For instance, trigger 120 may include any two of a webhook, AI agent 124, or approval node. In some embodiments, trigger 120 may include all three of a webhook, AI agent 124, and approval node. In some embodiments, AI agent 124 may be executable at an approval node. For instance, rather than entity consent, AI agent 124 may perform an analysis of a computer processing step associated with an approval node and may approve or deny a continuance of one or more computer processing steps based on the approval or denial of the approval node.

Within dataflow 116, at trigger 120, artificial intelligence agent 124 may be programmed to execute agent executable 128, a webhook, an approval node, or other program described herein. An "artificial intelligence agent" as used in this disclosure refers to a program capable of performing a function using a machine learning model. Machine learning models may include, but are not limited to, logistic regression, decision tree, Naïve Bayes classifiers, generative adversarial network (GAN), random forest, K-nearest neighbors, linear regression, ridge regression, Q-learning, k-means clustering, large language models (LLMs), natural language processing, or any other form of machine learning model. A user may be able to modify AI agent 124. For instance a GUI in communication with processor 104 may receive user input. Based on received user input, a type of machine learning model of AI agent 124, data for input to AI agent 124, a format of output of AI agent 124, format of citations to data obtained by AI agent 124, or other parameters of AI agent 124 may be modified by processor 104. For instance a user may be able to select a type of language model of AI agent 124. AI agent 124 may be pre-trained. In some embodiments, AI agent 124 may be trained on custom training data provided by a user. In some embodiments, AI agent 124 may be combined with one or more other trigger types described herein. For instance, AI agent 124 may perform agent executable 128 in the form of approving or denying a computer processing step at an approval node, performing a webhook process, or other trigger type.

Processing template 112 may have a plurality of AI agents 124 of a same or differing machine learning model type. In some embodiments, two or more AI agents 124 may be inserted into the same computer processing step. For instance a singular trigger 120 may cause execution of two or more AI agents 124. In some embodiments, multiple triggers 120 may be inserted into the same computer processing step. In some embodiments, each AI agent 124 of two more AI agents 124 of a computer processing step may operate independently or sequentially. In embodiments where multiple triggers 120 are inserted into the same computer processing step, at least two triggers 120 may be of a differing trigger type. In some embodiments, a computer processing step may include multiple triggers 120 of the same trigger type. Within processing template 112, in some embodiments, a first trigger 120 may cause execution of a first artificial intelligence agent 124, and a second trigger 120 may cause execution of a second artificial intelligence agent 124 that may be similar or different to the first artificial intelligence agent 124. In some embodiments, a machine learning type of AI agent 124 may be selected by a user, such as through a GUI in communication with processor 104. In other embodiments, processor 104 may pre-select a machine learning type of AI agent 124 based on, but not limited to, a tasks of a computer processing step associated with AI agent 124, similarity between dataflow 116 and a dataflow of one or more other processing templates 112, or other criteria. In some embodiments, processing template 112 may have a plurality of AI agents 124 with at least two different forms of machine learning models.

An "agent executable" as used in this disclosure is a task an artificial intelligence agent is configured to perform. Tasks may include, but are not limited to, generation of one or more characters, symbols, strings, words, and/or phrases, generation and/or communication of a data query, data field entry, generation of data columns and/or rows, summation of textual and/or pictorial data, or any other computer process described herein. For instance and without limitation agent executable 128 may include comparing documents with one or more policies, querying the Internet or other databases for potential risks in procurement of goods and/or services with entities, verifying information of intake forms, verifying costs of invoices with payments, or other functions. In embodiments where agent executable 128 includes comparing one or more documents with one or more policies, documents may be compared to System and Organization Control (SOC) and/or SOC 2 policies or any other policies.

In some embodiments, AI agent 128 may be programmed to perform two or more agent executables 128. In embodiments where AI agent 128 may be programmed to perform two or more agent executable 128, each agent executable 128 may be different or similar to each other. For instance a first agent executable 128 may be for textual summation, while a second agent executable 128 may be for generation of a data query, without limitation. Agent executable 128 may be customized based on user input. For instance, a GUI in communication with a display device in communication with processor 104 may allow for selection of one or more agent executables 128 for one or more AI agents 124 to perform. In some embodiments, a GUI in communication with processor 104 may provide a pre-generated list of agent executables 128 for a user to select. A pre-generated list may be generated by processor 104 based on one or more computer processing steps within dataflow 116, prior execution of processing templates 112 having similar dataflows 116 to each other, or other criteria. In some embodiments, processor 104 may provide a customization option via a GUI for a user to provide a type of agent executable 128 and/or a function of agent executable 128. Data utilized for agent executable 128 may be user selected such as through a GUI in communication with processor 104. For instance, a user may select a data pathway within a data storage system and/or an external source of data via GUI input. In some embodiments, processor 104 may automatically select a data source for agent executable 128 based on, but not limited to, computer processing step type, AI agent 124 type, function of agent executable 128, prior and/or subsequent computer processing steps, or other parameters. In some embodiments, each AI agent 124 may be provided with an expected output format, which may be user selected or automatically selected by processor 104. Output formats may include, but are not limited to, markdown format, comma separate value (.csv) format, XML format, SQL format, or other types of formats. In some embodiments, two or more AI agents 124 may have two different output formats. In other embodiments, two or more AI agents 124 may have the same output format.

In some embodiments, agent executable 128 may include a prompt. A prompt of agent executable 128 may be used as input to one or more AI agents 124. A "prompt" as used in this disclosure refers to textual data providable as input to a language model. Prompts may include, but are not limited to, zero-shot learning prompts, one-shot learning prompts, few-shot learning prompts, chain of thought prompts, iterative prompts, negative prompts, hybrid prompts, prompt chaining, or any other variation of prompts. In some embodiments, processing template 112 may include two or more agent executables 128 having different prompt types. In other embodiments, processing template 112 may include two or more agent executables 128 having a similar or the same prompt type. Prompts may instruct AI agent 124 to perform functions such as, but not limited to, assuming a role, summation of text, data querying, population of one or more data fields, comparison of two or more data objects, or any other function described herein without limitation. A user may be able to provide one or more prompts for AI agent 124, such as through a GUI in communication with processor 104. In some embodiments, agent executable 128 may include two or more prompts of different or similar prompt styles.

With continued reference to FIG. 1, dataflow 116 may cease after completion of one or more computer processes. Dataflow 116 may generate output 136. Processor 104 may be configured to obtain input 132. Input 132 may be data received from external computing devices and/or user input, without limitation. Execution of dataflow 116 of processing template 112 may generate output 136. In some embodiments, input 132 may be textual and/or pictorial data relating to one or more entities, Entities may be, but are not limited to, individuals, companies, organizations, or other forms of entities. Textual and/or pictorial data relating to an entity may be representative of, but not limited to, procurement data. Procurement data" as used in this disclosure refers to any information relating to the process of obtaining goods and/or services. Procurement data may include, but is not limited to, item descriptions, costs, delivery dates, invoices, projected delivery dates, source name, customer name, goods type, service type, or any other information relating to procurement. Input 132 may be received via a connector associated with trigger 120 at one or more computer processing steps. In some embodiments, dataflow 116 may produce output 136 in the form of, but not limited to, textual data, pictorial data, graphs, or other data. Output 136 may include procurement information. For instance, input 132 may include procurement information and may be modified through processing template 112. Output 136 may be a modification of procurement information received as input 132. For instance, output 136 may include, but is not limited to, customer names, supplier names, service types, costs, delivery dates, contract dates, risk management data, performance management data, or any other type of data described herein. In some embodiments, output 136 may be provided in markdown format. "Markdown format" as used in this disclosure refers to formatted text accessible using a plain-text editor. One or more prompts of agent executable 128 may include prompting one or more AI agents 124 to generate text in markdown format, comma separate value (csv) format, XML format, SQL format, or other types of formats.

With continued reference to FIG. 1, processor 104 may be configured to run an execution engine. An "execution engine" as used in this disclosure refers to a software capable of processing one or more processing templates. An execution engine may control run time logic of dataflow 116 within processing template 112. In some embodiments, an execution engine may parse processing template 112 into a syntax tree. A "syntax tree" as used in this disclosure refers to a tree representation of the abstract syntactic structure of code written in a programming language. Each step of processing template 112 may be converted into a node of a syntax tree. A syntax tree may include control logic such as, but not limited to, for loops, if conditions, return statements, terminate, sleep, or other control logic. In some embodiments, an execution engine may handle authentication and token refresh between two or more softwares. For instance, verification and/or authentication codes, tokens, and the like may be communicated between two or more computing devices. An execution engine may handle coordination and/or submission of authentication and tokens. An execution engine may handle API communications between two or more softwares. For instance, at a computer processing step of dataflow 116, a connector may be triggered to communicate to one or more applications through an API. An execution engine may facilitate communication between software run on processor 104 and software run on an external computing device via one or more APIs. An execution engine may manage rate limit handling. Rate limits may be a limit on an amount of requests submitted to a server. An execution engine may handle rate limits submitted to a server via a user or one or more computer processing steps of processing template 112. In some embodiments, an execution engine may manage computer processing step execution. For instance, an execution engine may ensure a computer processing step is executed correctly and may flag the computer processing step of it is not executed correctly. An execution engine may manage data mapping. For instance, data of one or more computer processing steps may be mapped to data of one or more other computer processing steps. Outputs of one computer processing step may be used as inputs to one or more other computer processing steps. In some embodiments, a computer processing step may refer back to one or more data structures of other computer processing steps. An execution engine may manage data mapping of dataflow 116. In some embodiments, an execution engine may perform error handling. For instance, dataflow 116 may encounter one or more errors upon execution. Errors may include, but are not limited to, missing data, computer miscalculations, faulty control logic, faulty connections to servers, or other failure points. An execution engine may monitor failure within data flow 16 and may attempt to resolve and/or flag the failure. An execution engine may log execution of dataflow 116, such as, but not limited to, start times of each computer processing step, duration of each computer processing step, amounts of data used at each computer processing step, user login, data updates, or other logging functions.

With continued reference to FIG. 1, processor 104 may be configured to operate a configuration wizard. A "configuration wizard" as used in this disclosure refers to an executable program that allows for a user to modify a computing system. A configuration wizard may assist in setting up connections to one or more applications, mapping data fields from a source to a target destination, adding control logic, filtering data, or other modifications of processing template 112. A configuration wizard may include one or more GUI elements that may visually assist a user in setting up processing template 112. For instance, icons, text boxes, and the like may be displayed through a GUI that may correspond to data source selection, computer processing step type, AI agent 124 selection, agent executable 128 selection, output format selection, control logic, or any other modification of processing template 112. In some embodiments, processor 104 may be configured to generate processing template 112 through user input received via a configuration wizard, which may allow a user to generate processing template 112 without knowledge of computer science and/or coding. A configuration wizard may allow a user to modify execution structures of processing template 112. For instance, a configuration wizard may allow modification of control logic and one or more nodes of a syntax tree generated from processing template 112.

In some embodiments, processor 104 may be configured to generate a marketplace of processing templates 112. For instance, one or more processing templates 112 may be organized into a marketplace of processing templates 112. A marketplace of processing templates 112 may be hosted on a server or other form of computing device. A marketplace of processing templates 112 may have two or more process-ing templates 112 for pre-defined tasks. For instance, a first processing template 112 may be for procurement of fiber optic cable infrastructure, while a second processing tem-plate 112 may be for consulting services. Users may be able to upload custom processing templates 112 to a server hosting a marketplace of processing templates 112. In some embodiments, processing template 112 may be downloaded by processor 104 from a marketplace of processing tem-plates 112. A processing template 112 downloaded from a market place of processing templates 112 may have one or more pre-set computer processing steps, control logic, data sources, or other variables. A user may be able to adjust one or more variables of a downloaded processing template 112 to accommodate specific tasks. A marketplace of processing templates 112 may be sorted by category, complexity, titles, author, or other filters. For instance, a marketplace of processing templates 112 may be sorted into categories such as consulting services, shipping services, final project builds, duration, or other factors.

Execution of dataflow 116 may generate output 136. Output 136 may be generated text that may be generated from one or more language models. Output 136 may be a placement of a procurement order for one or more entities. In some embodiments, output 136 may be a summary of data generated via dataflow 116. For instance, output 136 may be a summary of entity data, procurement data, computer processing step completion, identified risks and/or errors of dataflow 116, or other summaries. "Entity data" as used in this disclosure refers to any information relating to an individual, organization, or company. For instance, entity data may include, but is not limited to, names, addresses, relevant manufacturing products, relevant services, or other information. For instance, procurement data may include, but is not limited to, type of good, type of service, costs, delivery dates and/or times, or other data. In some embodi-ments, output 136 may be a machine learning model gen-erated analysis of one or more reports relating to an entity. Reports may include, but are not limited to, audit reports, environmental social and governance reports, or any other report.

In some embodiments, output 136 may include advisory data. "Advisory data" as used in this disclosure refers to information relating to a possible occurrence of an event. Advisory data may include warnings of, but not limited to, supply chain issues, tariffs, transit blockages, or other data. For instance, output 136 may include data relating to pos-sible world scenarios that may impact procurement of goods and/or services. One or more AI agents 124 may perform one or more agent executables 128 that may relate to prediction of events associated with procurement of one or more entities. For instance, AI agent 124 may perform agent executable 128 that may include assessing risks of obtaining goods or services from an entity, and may generate advisory data based on the assessment. Assessment may include querying one or more databases for adverse media relating to a procurement identified in input 132. Adverse media may include news publications, vlogs, videos, or any other form of media that may impact a procurement of goods or services. One or more AI agents 124 may perform one or more agent executables 128 relating to adverse media research and/or assessment. In some embodiments, output 136 may include advisory data relating to a procurement identified at input 132. As a non-limiting example, output 136 may include text stating "All listed categories (5G equipment, AI hardware, networking gear, consumer elec-tronics) face high tariff exposure estimated at 145%, adding $10,223 to your purchase."

In some embodiments, processor 104 may be configured to generate processing template 112 based on user input received through a graphical user interface (GUI) in com-munication with processor 104. For instance, a user may select one or more computer processing steps to include in processing template 112. A user may add, remove, and/or modify one or more computer processing steps of processing template 112 through a GUI in communication with proces-sor 104. In some embodiments, processor 104 may be configured to generate processing template 112 without user input. For instance, processor 104 may be configured to generate processing template 112 based on input 132, one or more previously used processing templates 112, or other data. Processor 104 may utilize a classifier that may be trained on training data categorizing input data to one or more processing template 112 categories. Training data may be received via user input, external computing devices, and/or previous iterations of processing. Categories of pro-cessing templates 112 may include, but are not limited to, output types, input types, AI agent types, or other categories of processing templates 112. As a non-limiting example, processor 104 may receive input 132 and may classify input 132 relating to procurement of manufacturing goods, to which processor 104 may pre-generate processing template 112 for a user. Processor 104 may be configured to auto-matically generate temporal arrangements of two or more computer processing steps of processing template 112, trig-gers 120, AI agents 124, and/or agent executables 128.

Figure 2:
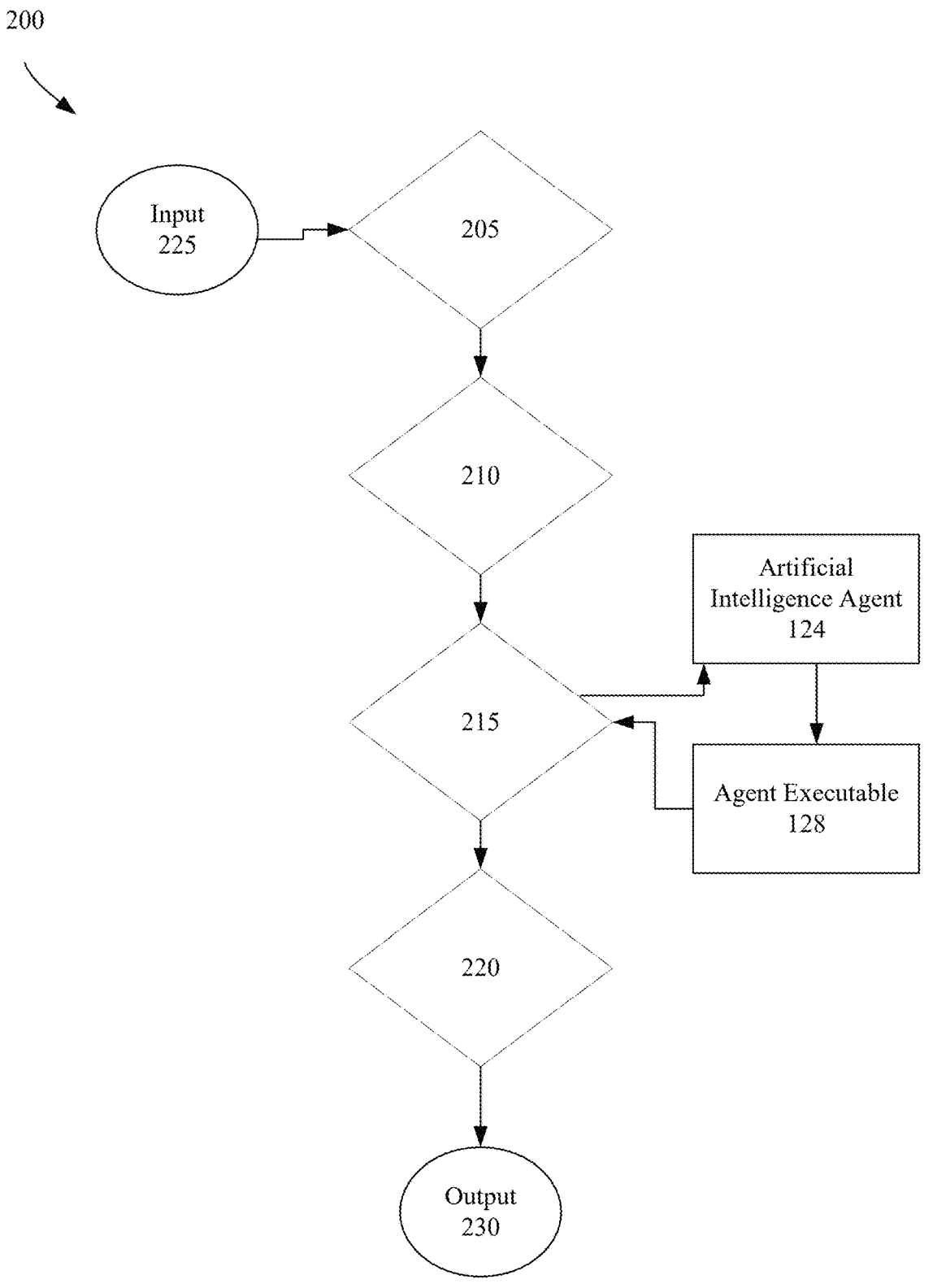
FIG. 2 illustrates a processing template.

Referring now to FIG. 2, a diagram of a processing template 200 is presented. Processing template 200 may be the same as processing template 112 described above with reference to FIG. 1. Processing template 200 may include computer processing steps 205, 210, 215, and/or 220, although fewer or more computer processing steps may be implemented, without limitation. In some embodiments, processing template 200 may have a non-sequential order of computer processing steps. For instance, processing tem-plate 200 may have two or more computer processing steps that may occur in parallel. In some embodiments, each computer processing step 205, 210, 215, and 220 may perform a different function than each other. In other embodiments, at least two of computer processing steps 205, 210, 215, and 220 may perform the same function. Functions of computer processing steps 205, 210, 215, and 220 may be any function described herein. Computer processing step 205 may be provided input 225. Input 225 may be the same as input 132 as described above with reference to FIG. 1. Computer processing step 205 may take input 225 and generate a form of output, which may be communicated to computer processing step 210. Computer processing step 210 may perform a function similar or different to computer processing step 205 and may generate output, which may be used as input to computer processing step 215. In some embodiments, computer processing step 215 may have a trigger that executes AI agent 124. AI agent 124 may be the same as described above with reference to FIG. 1. AI agent 124 may execute agent executable 128. Agent executable 128 may be the same as described above with reference to FIG. 1. In some embodiments, AI agent 124 may execute two or more agent executables 128. A trigger at computer processing step 215 may execute two or more AI agents 124. In some embodiments, a user may insert a trigger at com-puter processing step 215. In other embodiments, a proces-sor operable to run processing template 200 may automatically place a trigger at computer processing step 215. For instance, based on a final output of processing template 200, computer processing steps 205 and 210, and/or computer processing step 220, a processor may insert a trigger at computer processing step 215. In some embodiments, a trigger may be insertable into any of computer processing steps 205, 210, 215, and/or 220.

Computer processing step 215 may have a trigger type such as, but not limited to, an AI agent trigger, approval node trigger, webhook trigger, and/or connector trigger. In embodiments where computer processing step 215 has an AI agent trigger, AI agent 124 may be executed to perform agent executable 128. AI agent 124 may be any form of machine learning model described herein. In some embodiments, AI agent 124 may be modified. For instance, a user may select a type of machine learning model AI agent 124 may be, data sources for AI agent 124 to perform agent executable 128, output format of AI agent 124, or other factors of AI agent 124. In some embodiments, agent executable 128 may be modifiable. For instance, agent executable 128 may be a prompt that may be user generated or pre-set. A user may edit a prompt of agent executable 128, a function of agent executable 128, or other parameters. In some embodiments, control logic may be added, modified, or removed at each step of computer processing steps 205, 210, 215, and 220.

With continued reference to FIG. 2, in some embodiments, one or more parts of processing template 200 may be executed in isolation, which may allow for testing of one or more computer processing steps of processing template 200. For instance, any one of computer processing steps 205, 210, 215, and/or 220 may be executable alone with test data. In some embodiments, AI agent 124 may execute agent executable 128 in isolation, which may allow a user to ensure operation of AI agent 124 before deployment of processing template 200.

In some embodiments, processing template 200 may allow for an output preview generation. An "output preview generation" as used in this disclosure is a sample output of a processing template or computer processing step thereof. For instance, an output of one or more computer processing steps of processing template 200 may be provided. Output preview generation may include, but is not limited to, sample textual data, sample graphical data, sample advisory action data, or sample versions of any other output described herein. For instance, an output preview generation may be a preview of an output of AI agent 124 after executing agent executable 128.

Referring now to FIG. 3, a processing template 300 of an orchestration of a plurality of AI agents is presented. Processing template 300 may include computer processing steps 310A-C, 315A-C, and/or 320A-C. In some embodiments, each processing step of processing template 300 is different than each other. In some embodiments, at least two processing steps of processing template 300 are the same. Processing template 300 may have computer processing step 305. Computer processing step 305 may be an initial processing step in processing template 300 that may receive input 336 directly. Processing step 305 may perform a function using received input 336 and may provide output to any or all of processing steps 310A-C. In some embodiments, processing step 310A may be temporally arranged to occur before either or both of processing steps 310B-C. In some embodiments, processing steps 310A-C may be temporally arranged to occur in parallel with each other. Processing template 300 may be directed by control logic, which may be user set or pre-define. For instance, each step of processing steps 310A-

C, 315A-C, and/or 320A-C may include Boolean logic. An output of processing step 310A may be provided to processing step 315A as input. Processing step 315A may have an AI agent trigger, which may invoke AI agent 324A. AI agent 324A may be programmed to perform agent executable 328A. An output of agent executable 328 may be provided to either or both of processing step 320B and processing step 315B. For instance, processing step 310B may receive input from processing step 305. Processing step 310B may have an AI agent trigger that may invoke AI agent 324B to perform agent executable 328B. AI agent 324B may be the same or different from AI agent 324A. Agent executable 328B may be the same or different from that of agent executable 328A. In some embodiments, output from agent executable 328A may be used as by AI agent 324B in conjunction with or separate from output provided by processing step 310B. An output of agent executable 328B may be provided to either or both of processing step 315B and AI agent 324C. AI agent 324C may be the same or different than either or both of AI agents 324A and 324B.

AI agent 324A may have a temporal arrangement different than that of AI agent 324B and/or 324C. For instance, a trigger for AI agent 324A may be inserted at step 315A, while a trigger for AI agent 324B may be inserted at step 310B and a trigger for AI agent 324C may be inserted at step 320C. Any temporal arrangement of triggers and/or AI agents 324A-C may be used, without limitation. In some embodiments, additional AI agents apart from AI agents 324A-C may be utilized in processing template 300. Types of machine learning utilized by AI agents 324A-C, data sources for AI agents 324A-C, output formats for AI agents 324A-C, and/or data citations of AI agents 324A-C may be modifiable via user input through a GUI. In some embodiments, variables of AI agents 324A-C may be preset. For instance in some embodiments, processing template 300 may be downloaded by a marketplace of processing templates and may have one or more preset values for an computer processing step of processing template 300, inclusive of triggers, AI agents 324A-C, and agent executables 328A-C.

Referring still to FIG. 3, processing step 320B may provide output 332A. Processing step 315B may provide output to processing step 320B. Processing step 320B may receive output from processing step 315B and generate output 332B. Processing step 310C may generate output that may be received at processing step 315C. Processing step 315C may generate output that may be used by processing step 320C. Processing step 320C may include execution of agent executable 328C. An output of agent executable 328C may be provided as output 332C. In some embodiments, outputs of parallel processing steps may be combined. For instance, output 332A and/or 332C may be combined with output 332B. In some embodiments, each output 332A-C may be provided separately from one another. One of ordinary skill in the art would appreciate, upon reading this disclosure, the many possible combinations of processing units, triggers, AI agents, agent executables, and output combinations that may be implemented using technologies described herein.

Figure 4A:
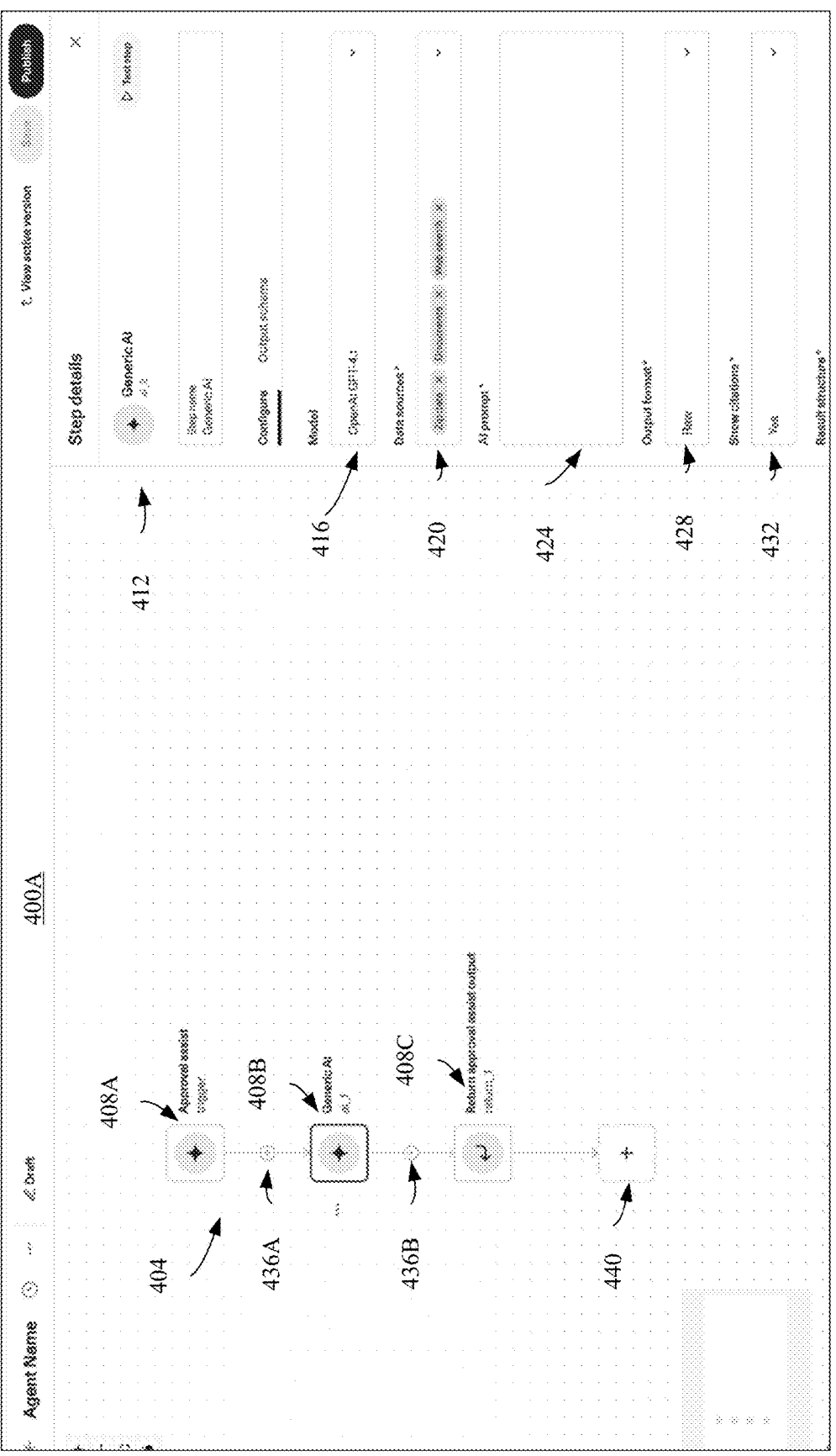

Referring now to FIG. 4A, an illustration of a GUI 400A is presented. GUI 400A may include a pictorial representation of processing template 404. Processing template 404 may be as described above with reference to FIG. 1. Processing template 404 may have computer processing steps 408A-C, each of which may as described above with reference to FIGS. 1-3.

While computer processing steps 408A-C are illustrated in a linear sequence, any other sequence of computer processing steps may be implemented. In some embodiments, each computer processing step 408A-C may perform a function different from the others. In other embodiments, at least two of computer processing steps 408A-C may perform similar functions. Output from computer processing step 408A may be used as input to computer processing step 408B. Output from computer processing step 408B may be used as input to computer processing step 408C. In some embodiments, a user may be able to add, remove, and/or modify one or more computer processing steps via interaction with GUI 400A. For instance, GUI 400A may include modification icons 436A-B. A "modification icon" as used in this disclosure refers to a graphical element representative of a modification to one or more computer processing steps. For instance, interaction with modification icon 436A may allow for addition of one or more computer processing steps 408 and/or removal of one or more computer processing steps 408. Modification icon 436B may have the same functionality as that of modification icon 436A. In some embodiments, a modification icon may appear after and/or before each computer processing step in a sequence of computer processing steps. Interaction with modification icon 436A and/or 436B may allow for additions of computer processing steps 408 in any combination of sequences of computer processing steps described herein, such as, but not limited to, sequential, non-sequential, recursive, branch tree, or other sequences. GUI 400A may include addition icon 440. An "addition icon" as used in this disclosure is a graphical element representative of an addition of one or more computer processing steps. Interaction with addition icon 440 may allow a user to add one or more computer processing steps 408 to processing template 404. In some embodiments, interaction with computer processing steps 408A-C displayed through GUI 400A may allow for a user to modify a type of function of any of computer processing steps 408A-C, triggers of computer processing steps 408A-C, AI agents inserted into computer processing steps 408A-C, or any other modification of processing template 404 described herein.

GUI 400A may include AI agent configuration window 412. An "AI agent configuration window" as used in this disclosure is a rectangular or square icon representative of one or more parameters of an AI agent. AI agent configuration window 412 may be displayed on a left or right side of processing template 404. In some embodiments, AI agent configuration window 412 may be a pop-up window. For instance, a user may interact with icons representative of any of computer processing steps 408A-C, which may trigger AI agent configuration window 412 to pop-up on GUI 400A. In some embodiments, AI agent configuration window 412 may only pop-up if a user selects an AI agent to be inserted into any of computer processing steps 408A-C through interaction with GUI 400A.

In some embodiments, AI agent configuration window 412 may include model selection icon 416. A "model selection icon" as used in this disclosure refers to a graphical element representative of a machine learning model. For instance, model selection icon 416 may be a drop-down menu, scrolling menu, text box, or other form of graphical element. Model selection icon 416 may allow a user to select a type of machine learning model of any AI agent described herein. In some embodiments, model selection icon 416 may allow a user to specify a sub-set of machine learning model of an AI agent, such as a specific form of language model.

AI agent configuration window 412 may include data source field 420. A "data source field" as used in this disclosure is a data structure indicative of a source of data. A user may specify a data source through interaction with data source field 420. Data specified through interaction of data source field 420 may be used as input to an AI agent. AI agent configuration window 412 may have prompt field 424. A "prompt field" as used in this disclosure refers to a text box utilized for prompting a machine learning model. For instance, a user may provide any form of prompt in prompt field 412, which may be utilized as input to an AI agent. AI agent configuration window 412 may include output format field 428. An "output format field" as used in this disclosure refers to a graphical icon representative of a form of data output. Output format field 412 may be a text field, drop-down menu, scrolling list, or other form of input field, without limitation. A user may interact with output format field 428 which may allow for specification of an output of an AI agent. AI agent configuration window 412 may include citation field 432. A "citation field" as used in this disclosure refers to a graphical icon representing a selection of citations. For instance, selection of citations through interaction with citation field 432 may allow for specify that an AI agent should produce citations to any data obtained through execution. Citations may include, but are not limited to, weblinks, HTTP strings, journal entry citations, or any other form of citation.

Figure 4B:
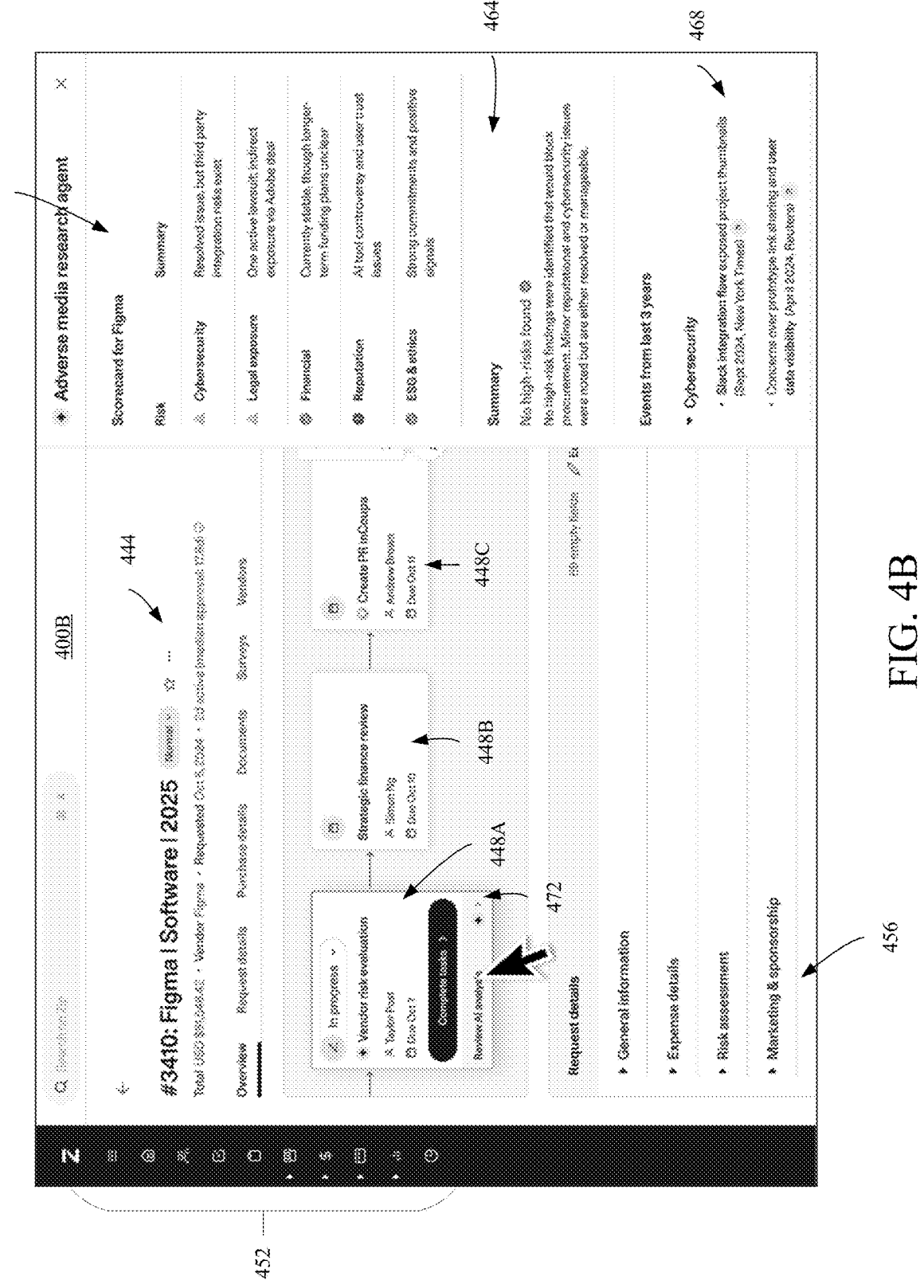

Referring now to FIG. 4B, another illustration of a GUI 400B is presented. GUI 400B may have processing template summary 444. Processing template summary 444 may include details of a processing template, such as, but not limited to, entity data, procurement data, dates, times, approval node data, or other information. GUI 400B may include computer processing steps 4448A-C. GUI 400B may include detail request window 456. Detail request window 456 may include one or more tabs that may correspond to details of a processing template. Tabs of detail request window 456 may be drop down tabs. For instance, a user may interact with one or more tabs of detail request window 456, which may trigger a drop down menu for the one or more tabs. GUI 400B may include menu 452. Menu 452 may include one or more icons that may correspond to navigation of GUI 400B. For instance, icons of menu 452 may correspond to, but are not limited to, home buttons, contact buttons, transaction buttons, activity buttons, marketplace buttons, order buttons, or other buttons.

Referring back to computer processing step 448A, computer processing step 448A may have AI analysis icon 472. An "AI analysis icon" as used in this disclosure refers to a graphical element representative of artificial intelligence analysis of data. AI analysis icon 472 may be displayed at a bottom of computer processing step 448A. For instance, computer processing step 448A may be a rectangular or square window, and AI analysis icon 472 may be displayed at a bottom part of the rectangular or square window. In some embodiments, AI analysis icon 472 may be colored differently than a coloring of a window of computer processing step 448A. For instance and without limitation, AI analysis icon 472 may be grey, tan, blue, red, green, or any other color. Interaction of AI analysis icon 472 may generate AI report 460. An "AI report" as used in this disclosure refers to a summary of an artificial intelligence analysis. AI report 460 may pop-up after interaction with AI analysis icon 472. AI report 460 may be displayed at a right side of GUI 400B, left side of GUI 400B, bottom side of GUI 400B, or top side of GUI 400B. AI report 460 may include a listing of one or more parameters related to an entity associated with a processing template. For instance and without limitation, AI report 460 may display one or more risks associate with interacting with an entity. Risks may include, but are not limited to, cybersecurity risks, legal exposure, financial risks, reputation risks, Environmental, Social, Governance (ESG) and ethics risks, or other risks. AI report 460 may be color coded. For instance, adjacent a title of each risk factor a color coded icon may be displayed. Any color code may be used without limitation. For instance, a yellow triangle may represent uncertainty with a risk factor, a green circle may represent no risk for a risk factor, and a red circle may represent high risk for a risk factor. AI report 460 may include a summary displayed next to each identified risk. A summary may be for, but is not limited to, cybersecurity, legal exposure, financial status, reputation, ESG and ethics, or other risk factors. AI report 460 may include AI summary 464. AI summary 464 may include textual data representative of an overall risk associated with an entity. In some embodiments, AI summary 464 may include a color code. For instance, green text may represent no risks, yellow text may represent some risk, and red text may represent high risk. In some embodiments, an icon may be displayed in AI summary 464 that may represent a risk associated with an entity. For instance, a yellow triangle may represent uncertainty with a risk factor, a green circle may represent no risk for a risk factor, and a red circle may represent high risk for a risk factor. AI report 460 may include AI insight 468. "AI insight" as used in this disclosure refers to information discerned by a machine learning model. AI insight 468 may display textual data representative of information relating to one or more risk factors. In some embodiments, AI insight 468 may include an indenting format with headers, subheaders, and/or body text. AI insight 468 may reflect one or more factors considered by one or more AI agents in calculating risks displayed in AI report 460.

Referring now to FIG. 4C, another embodiment of a GUI 400C is presented. GUI 400C may include citation column 490. A "citation column" as used in this disclosure is an arrangement of sources of data. Citation column 490 may include one or more citations 494A-G. A "citation" as used in this disclosure is a reference to a source of data. Citations 494A-G may have snippets of data. For instance, each citation of citations 494A-G may have textual and/or pictorial data relating to a form of information that may have been utilized by an AI agent or user. Citations may be generated by one or more machine learning models. In some embodiments, each time an AI agent performs a function requiring data retrieval, the AI agent may track one or more data sources and generate one or more citations to one or more data sources. Citations may be generated for any form of data described herein. In some embodiments, each citation 494A-G may have a corresponding hyperlink 498-F. A "hyperlink" as used in this disclosure refers to a digital reference that connects one portion of a GUI to another. For instance, hyperlinks 498A-F may link citations 494A-G to one or more sources of data. Upon interaction with any of hyperlinks 498A-F, GUI 400C may display a data source connected to any of hyperlinks 498A-F. Data sources may include, but are not limited to, web pages, articles, research papers, publications, or any other form of data source.

Figure 5:
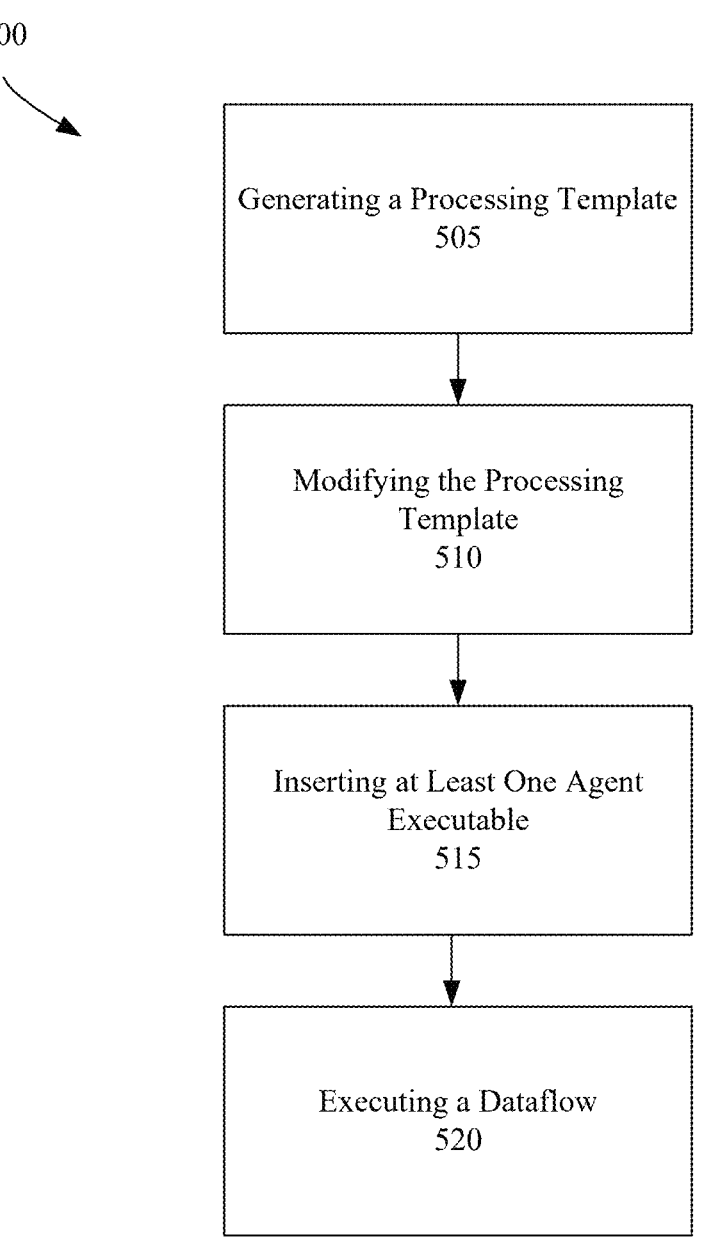
FIG. 5 illustrates a flowchart of a method of orchestrating an artificial intelligence agent.

Referring now to FIG. 5, a flowchart of a method 500 of orchestrating an AI agent is presented. At step 505, method 500 includes generating a processing template. A processing template may be generated by a processor. In some embodiments, a processing template may be generated via user input received through a GUI. A processing template may include one or more computer processing steps. In some embodiments, a processing template may include a temporal arrangement of one or more computer processing steps. A processing template may include control logic for one or more computer processing steps. In some embodiments, a processing template may be downloaded from one or more computing devices, such as but not limited to servers, laptops, desktops, or other computing devices. A processing template may be downloaded from a marketplace of processing templates.

At step 510, method 500 include modifying a processing template. A processing template may be modified to include one or more triggers. Triggers may be inserted into one or more computer processing steps of a processing template. In some embodiments, triggers may include a trigger type. For instance, triggers may be for webhooks, API calls, AI agents, approval nodes, or other triggers.

At step 515, method 500 includes inserting at least one agent executable into a processing template. An agent executable may be a function an AI agent may perform. Agent executables may include any AI function, such as, but not limited to, data queries, text generation, data structure comparison, or other functions. An agent executable may be inserted into a computer processing step of a processing template. In some embodiments, two or more agent executables may be inserted into a single computer processing step.

At step 520, method 500 includes executing a dataflow. A dataflow may be an execution of one or more computer processing steps of a processing template. A dataflow may be executed via an execution engine. Execution of a dataflow may produce one or more outputs, such as any output described herein. Method 500 may be performed as described with reference to FIGS. 1-4B, without limitation.

Figure 6:
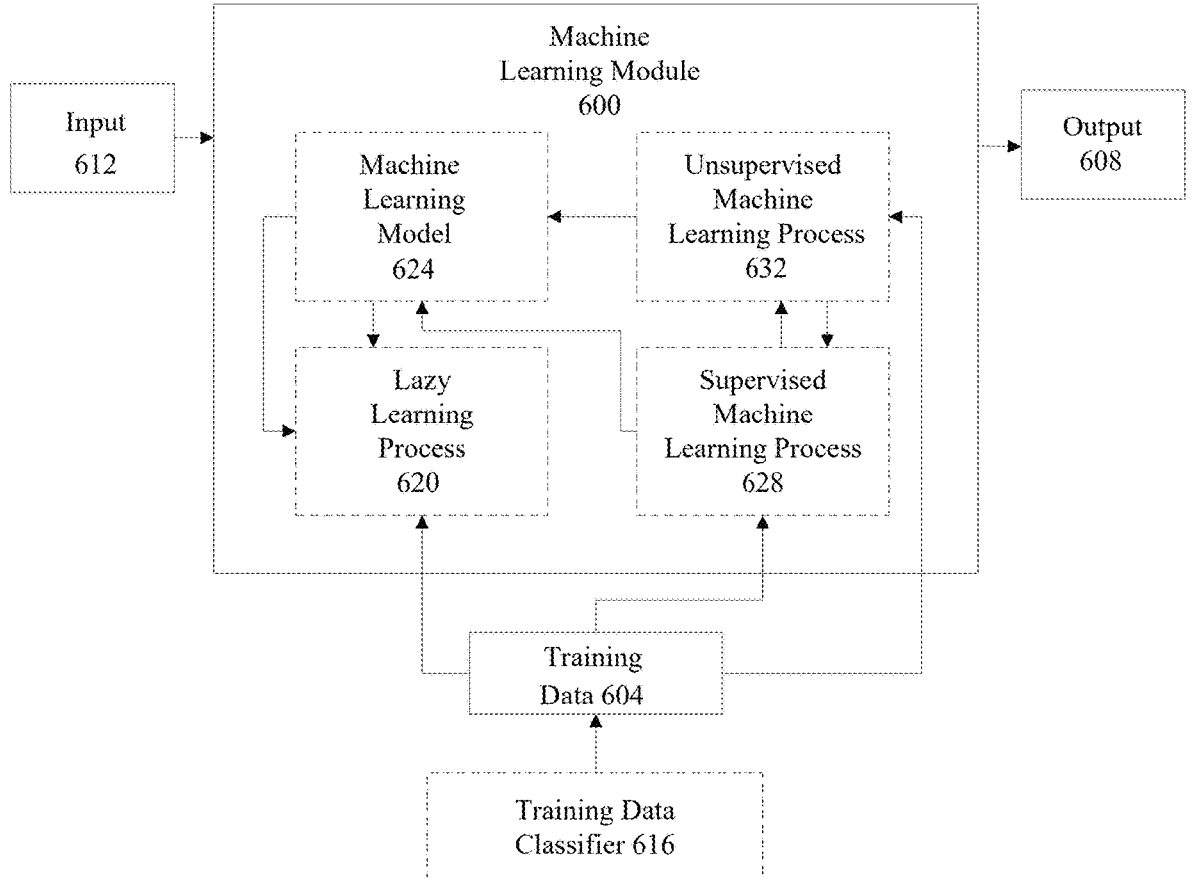
FIG. 6 illustrates a computing system that may be used with embodiments described herein.

Referring to FIG. 6, an exemplary machine-learning module 600 may perform machine-learning process(es) and may be configured to perform various determinations, calculations, processes and the like as described in this disclosure using a machine-learning process.

Still referring to FIG. 6, machine learning module 600 may utilize training data 604. For instance, and without limitation, training data 604 may include a plurality of data entries, each entry representing a set of data elements that were recorded, received, and/or generated together. Training data 604 may include data elements that may be correlated by shared existence in a given data entry, by proximity in a given data entry, or the like. Multiple data entries in training data 604 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations. Correlations may indicate causative and/or predictive links between categories of data elements, which may be modeled as relationships such as mathematical relationships by machine-learning processes as described in further detail below. Training data 604 may be formatted and/or organized by categories of data elements. Training data 604 may, for instance, be organized by associating data elements with one or more descriptors corresponding to categories of data elements. As a non-limiting example, training data 604 may include data entered in standardized forms by one or more individuals, such that entry of a given data element in a given field in a form may be mapped to one or more descriptors of categories. Elements in training data 604 may be linked to descriptors of categories by tags, tokens, or other data elements. Training data 604 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 6, training data 604 may include one or more elements that are not categorized. Uncategorized data of training data 604 may include data that may not be formatted or containing descriptors for some elements of data. In some embodiments, machine-learning algorithms and/or other processes may sort training data 604 according to one or more categorizations. Machine-learning algorithms may sort training data 604 using, for instance, natural language processing algorithms, tokenization, detection of correlated values in raw data and the like. In some embodiments, categories of training data 604 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure, without limitation.

Further referring to FIG. 6, training data 604 may be filtered, sorted, and/or selected using one or more supervised and/or unsupervised machine-learning processes and/or models as described in further detail below. In some embodiments, training data 604 may be classified using training data classifier 616. Training data classifier 616 may include a classifier. A "classifier" as used in this disclosure is a machine-learning model that sorts inputs into one or more categories. Training data classifier 616 may utilize a mathematical model, neural net, or program generated by a machine learning algorithm. A machine learning algorithm of training data classifier 616 may include a classification algorithm. A "classification algorithm" as used in this disclosure is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine-learning module 600 may generate a classifier, such as training data classifier 616 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to one or agent executables.

Still referring to FIG. 6, machine-learning module 600 may be configured to perform a lazy-learning process 620 which may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 6, machine-learning processes as described in this disclosure may be used to generate machine-learning models 624. A "machine-learning model" as used in this disclosure is a mathematical and/or algorithmic representation of a relationship between inputs and outputs, as generated using any machine-learning process including without limitation any process as described above, and stored in memory. For instance, an input may be sent to machine-learning model 624, which once created, may generate an output as a function of a relationship that was derived. For instance, and without limitation, a linear regression model, generated using a linear regression algorithm, may compute a linear combination of input data using coefficients derived during machine-learning processes to calculate an output. As a further non-limiting example, machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes.

Still referring to FIG. 6, machine-learning algorithms may include supervised machine-learning process 628. A "supervised machine learning process" as used in this disclosure is one or more algorithms that receive labelled input data and generate outputs according to the labelled input data. For instance, supervised machine learning process 628 may include prompts as described above as inputs, responses as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 6, machine learning processes may include unsupervised machine-learning processes 632. An "unsupervised machine-learning process" as used in this disclosure is a process that calculates relationships in one or more datasets without labelled training data. Unsupervised machine-learning process 632 may be free to discover any structure, relationship, and/or correlation provided in training data 604. Unsupervised machine-learning process 632 may not require a response variable. Unsupervised machine-learning process 632 may calculate patterns, inferences, correlations, and the like between two or more variables of training data 604. In some embodiments, unsupervised machine-learning process 632 may determine a degree of correlation between two or more elements of training data 604.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
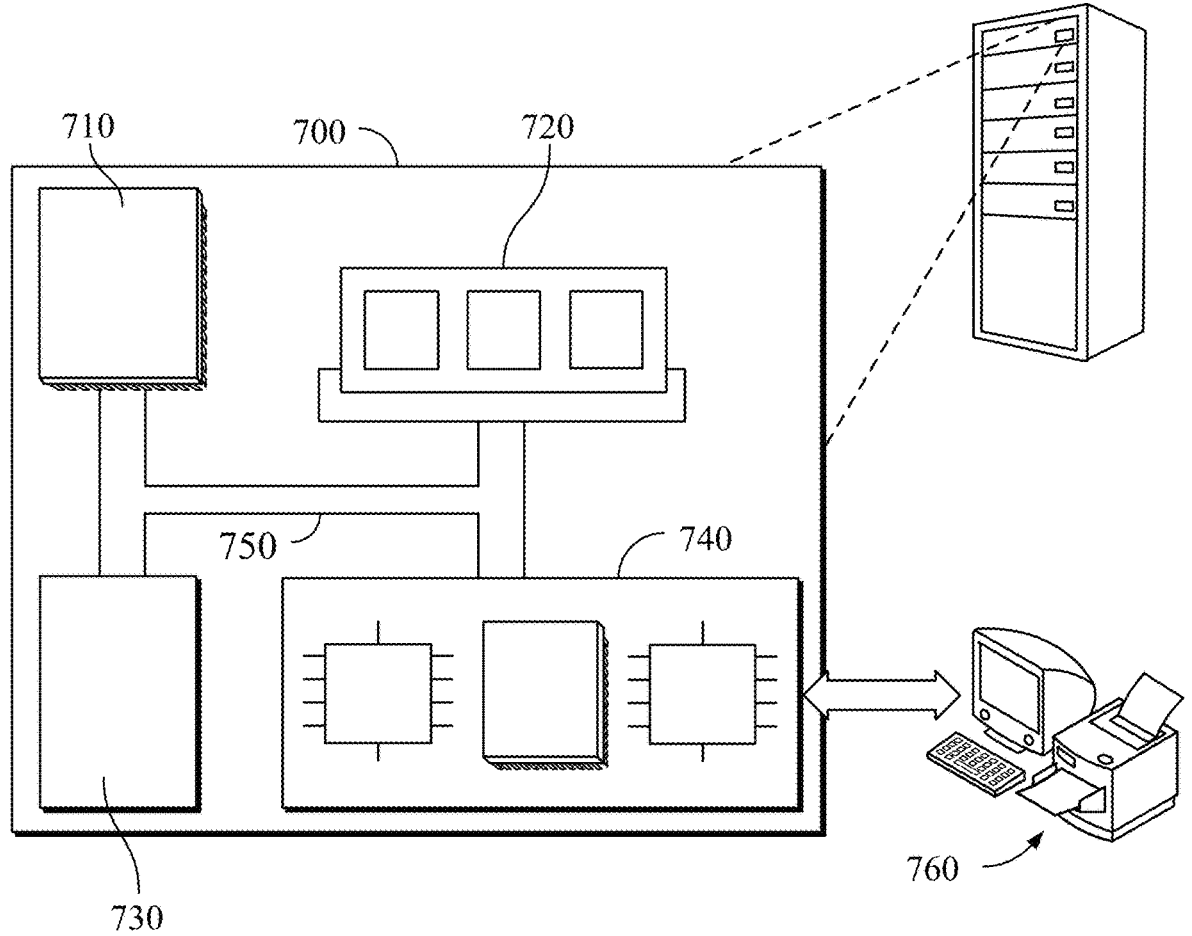
FIG. 7 illustrates a machine learning module that may be implemented in systems, apparatuses, and/or methods described herein.

Referring now to FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. System 700 may include disk storage and/or internal memory, each of which may be communicatively connected to each other. System 700 may include a processor 710. The processor 710 may enable both generic operating system (OS) functionality and/or application operations. In some embodiments, the processor 710 and the memory 720 may be communicatively connected. As used in this disclosure, "communicatively connected" means connected by way of a connection, attachment, or linkage between two or more elements which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, the processor 710 may include any computing device as described in this disclosure, including without limitation a microcontroller, microprocessor, digital signal processor (DSP) and/or system on a chip (SoC) as described in this disclosure. The processor 710 may include, be included in, and/or communicate with a mobile device such as a mobile telephone or smartphone. The processor 710 may include a single computing device operating independently, or may include two or more computing device operating in concert, in parallel, sequentially or the like. Two or more computing devices may be included together in a single computing device or in two or more computing devices. The processor 710 may interface or communicate with one or more additional devices as described below in further detail via a network interface device. Network interface device may be utilized for connecting the processor 710 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

The processor 710 may include but is not limited to, for example, a computing device or cluster of computing devices in a first location and a second computing device or cluster of computing devices in a second location. The processor 710 may include one or more computing devices dedicated to data storage, security, distribution of traffic for load balancing, and the like. The processor 710 may distribute one or more computing tasks as described below across a plurality of computing devices, which may operate in parallel, in series, redundantly, or in any other manner used for distribution of tasks or memory between computing devices. The processor 710 may be implemented using a "shared nothing" architecture in which data is cached at the worker, in an embodiment, this may enable scalability of system 700 and/or processor 710.

With continued reference to FIG. 7, processor 710 and/or a computing device may be designed and/or configured by memory 720 to perform any method, method step, or sequence of method steps in any embodiment described in this disclosure, in any order and with any degree of repetition. For instance, the processor 710 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks.

The processor 710 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. In some implementations, the processor 710 is a programmable (or reprogrammable) general purpose microprocessor or microcontroller. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more network interface devices, e.g., an Ethernet card, a serial communication device, e.g., an RS-232 port, and/or a wireless interface device, e.g., an 802.11 card, a 3G wireless modem, or a 4G/5G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array), an ASIC (application specific integrated circuit), non von neumann architectures, neuromorphic chips, and deep learning chips.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An apparatus for orchestrating an artificial intelligence agent, comprising:
   a processor; and
   a memory communicatively coupled to the processor, the memory containing instructions configuring the processor to:
   generate a processing template comprising a dataflow;
   modify the processing template to include a trigger for execution of the artificial intelligence agent at a point within the dataflow;
   insert at least one agent executable at the trigger of the processing template;
   convert the processing template into a syntax tree; and
   automatically execute the dataflow of the processing template via execution of the syntax tree, wherein at the trigger within the dataflow the artificial intelligence agent performs the agent executable.

2. The apparatus of claim 1, wherein the processor is further configured to:
   modify the processing template to include a plurality of triggers for execution of a plurality of artificial intelligence agents; and
   insert an agent executable at each trigger of the plurality of triggers.

3. The apparatus of claim 2, wherein the processor is further configured to:
   obtain at least one output of the agent executable of a first artificial intelligence agent; and
   provide the at least one output as input to a second artificial intelligence agent.

4. The apparatus of claim 1, wherein the processor is further configured to:
   receive user input; and
   modify a type of the artificial intelligence agent based on the user input.

5. The apparatus of claim 1, wherein the processor is further configured to:
   generate a prompt for the artificial intelligence agent; and
   modify the artificial intelligence agent executable to include the prompt, wherein the art.

6. The apparatus of claim 5, wherein the processor is further configured to:
   receive user input; and
   generate the prompt based on the user input.

7. The apparatus of claim 1, wherein the processor is further configured to select a data source for the agent executable.

8. The apparatus of claim 1, wherein the processor is further configured to:
   generate instructions for a markdown format for a user interface; and
   provide the instructions to the artificial intelligence agent, wherein the artificial intelligence agent generates a markdown format for the user interface based on the instructions.

9. The apparatus of claim 1, wherein the processor is further configured to:
   receive job data; and
   execute the dataflow using the job data as input.

10. The apparatus of claim 1, wherein the processor is further configured to execute the dataflow according to control logic.

11. A computer-implement method for orchestration of an artificial intelligence agent, comprising:
   generating a processing template comprising a dataflow;
   modifying the processing template to include a trigger for execution;
   inserting at least one agent executable at the trigger of the processing template;
   converting the dataflow into a syntax tree; and
   automatically executing the dataflow of the processing template via execution of the syntax tree, wherein at the trigger within the dataflow the artificial intelligence agent performs the agent executable.

12. The method of claim 11, further comprising:
   modifying the processing template to include a plurality of triggers for execution of a plurality of artificial intelligence agents; and
   inserting an agent executable at each trigger of the plurality of triggers.

13. The method of claim 12, further comprising:
   obtaining at least one output of the agent executable of a first artificial intelligence agent; and
   providing the at least one output as input to a second artificial intelligence agent.

14. The method of claim 11, further comprising:
   receiving user input; and
   modifying a type of the artificial intelligence agent based on the user input.

15. The method of claim 11, further comprising:
   generating a prompt for the artificial intelligence agent; and
   modifying the artificial intelligence agent executable to include the prompt, wherein the art.

16. The method of claim 15, further comprising:
   receiving user input; and
   generating the prompt based on the user input.

17. The method of claim 11, further comprising selecting a data source for the agent executable.

18. The method of claim 11, further comprising:
   generating instructions for a markdown format for a user interface; and
   providing the instructions to the artificial intelligence agent, wherein the artificial intelligence agent generates a markdown format for the user interface based on the instructions.

19. The method of claim 11, further comprising:
   receiving job data; and
   executing the dataflow using the job data as input.

20. A system for orchestration of an artificial intelligence agent, comprising:
   a computing device configured to:
   receive job data;
   obtain a processing template comprising a dataflow;
   identify a trigger associated with an artificial intelligence agent at a point within the dataflow;
   convert the processing template into a syntax tree;
   execute the syntax tree through an execution engine;
   activate the artificial intelligence agent at the point within the dataflow to perform an agent executable using the job data; and
   communicate the output of the agent executable to a user interface.

* * * * *